(12) United States Patent
Barbastathis et al.

(10) Patent No.: US 9,360,611 B2
(45) Date of Patent: Jun. 7, 2016

(54) SYSTEM, METHOD AND APPARATUS FOR CONTRAST ENHANCED MULTIPLEXING OF IMAGES

(75) Inventors: George Barbastathis, Boston, MA (US); Yuan Luo, Taipei (TW); Se Baek Oh, Cambridge, MA (US); Jennifer K. Barton, Tucson, AZ (US); Raymond K. Kostuk, Tucson, AZ (US)

(73) Assignees: Massachusetts Institute of Technology, Cambridge, MA (US); The Arizona Board of Regents on Behalf of the University of Arizona, Tucson, AZ (US)

( * ) Notice: Subject to any disclaimer, the term of this patent is extended or adjusted under 35 U.S.C. 154(b) by 970 days.

(21) Appl. No.: 13/500,461

(22) PCT Filed: Oct. 8, 2010

(86) PCT No.: PCT/US2010/051979
§ 371 (c)(1),
(2), (4) Date: Sep. 14, 2012

(87) PCT Pub. No.: WO2011/044463
PCT Pub. Date: Apr. 14, 2011

(65) Prior Publication Data
US 2012/0327492 A1   Dec. 27, 2012

Related U.S. Application Data

(60) Provisional application No. 61/381,369, filed on Sep. 9, 2010, provisional application No. 61/264,432, filed on Nov. 25, 2009, provisional application No. 61/250,306, filed on Oct. 9, 2009.

(51) Int. Cl.
*G03H 1/28* (2006.01)
*G02B 5/32* (2006.01)
*G03H 1/02* (2006.01)

(52) U.S. Cl.
CPC ............... *G02B 5/32* (2013.01); *G03H 1/0248* (2013.01); *G03H 1/28* (2013.01)

(58) Field of Classification Search
CPC ........... G02B 5/32; G03H 1/28; G03H 1/0248
USPC ....................................... 359/15–20
See application file for complete search history.

(56) References Cited

U.S. PATENT DOCUMENTS 3,636,248 A   1/1972   Korpel
4,942,112 A   7/1990   Monroe et al.
(Continued)

OTHER PUBLICATIONS
International Preliminary Report on Patentability by International Bureau of WIPO for International Application PCT/US2010/051975 dated Apr. 11, 2012 (7 pages).
(Continued)

*Primary Examiner* — Jennifer L. Doak
(74) *Attorney, Agent, or Firm* — McCarter & English, LLP; David R. Burns (57) ABSTRACT

A volume holographic imaging system, apparatus and/or method enables the projection of a two-dimensional (2D) slice of a four-dimensional (4D) probing object A 4D probing source object is illuminated to emit or scatter an optical field. A holographic element having one or more recorded holograms receives and diffracts the optical field into a diffracted plane beam having spectral information. A 4-ftelecentric relay system includes a pupil filter on the relayed conjugate plane of the volume hologram and images the pupil of the volume hologram onto the front focal plane of the collector lens. A collector lens focuses the diffracted plane beam to a 2D slice of the 4D probing source object. The focused 2D slice is projected onto a 2D imaging plane. The holographic element may have multiple multiplexed holograms that are arranged to diffract light from the corresponding slice of the 4D probing source object.

23 Claims, 6 Drawing Sheets

(56) References Cited

U.S. PATENT DOCUMENTS

| | | | |
|---|---|---|---|
| 5,966,243 | A | 10/1999 | Braunecker et al. |
| 6,495,818 | B1 | 12/2002 | Mao |
| 6,524,756 | B1 | 2/2003 | Wu |
| 6,744,048 | B2 | 6/2004 | Hosokawa et al. |
| 6,934,060 | B2 | 8/2005 | Psaltis |
| 7,158,228 | B2 | 1/2007 | Psaltis et al. |
| 7,312,908 | B2 | 12/2007 | Takemori et al. |
| 2007/0013999 | A1 | 1/2007 | Marks et al. |
| 2007/0216906 | A1 | 9/2007 | Javidi et al. |
| 2009/0073563 | A1 | 3/2009 | Betzig |
| 2010/0039918 | A1 | 2/2010 | Tanaka |
| 2012/0307326 | A1* | 12/2012 | Barbastathis et al. .......... 359/15 |

OTHER PUBLICATIONS

International Preliminary Report on Patentability by the International Bureau of WIPO for International Application PCT/US2010/051979 dated Apr. 11, 2012 (7 pages).

International Preliminary Report on Patentability by the International Bureau of WIPO for International Application PCT/US2010/051981 dated Apr. 11, 2012 (5 pages).

International Search Report and Written Opinion by International Searching Authority for International Application PCT/2010/51981 dated Dec. 13, 2010 (15 pages).

International Search Report and Written Opinion by International Searching Authority for International Application PCT/US2010/51975 mailed Dec. 13, 2010 (7 pages).

International Search Report and Written Opinion by International Searching Authority for International Application PCT/US2010/51979 dated Dec. 16, 2010 (13 pages).

Liu, Wenhai, George Barbastathis, and Demetri Psaltis. "Volume holographic hyperspectral imaging." Applied Optics, 43, No. 18, (Jun. 20, 2004): 3581-3599.

Luo, Y. "Novel Biomedical Imaging Systems", thesis submitted at University of Arizona. Jul. 18, 2008 (188 pages).

Luo, Yuan, et al. "Optimization of multiplexed holographic gratings in PQ-PMMA for spectral-spatial imaging filters." Optics letters 33, No. 6 (Mar. 15, 2008): 566-568.

Nagayama, Kuniaki. "Development of phase plates for electron microscopes and their biological application." European Biophysics Journal 37, No. 4 (Feb. 8, 2008): 345-358.

* cited by examiner

SYSTEM, METHOD AND APPARATUS FOR CONTRAST ENHANCED MULTIPLEXING OF IMAGES

RELATED APPLICATIONS

This application claims priority to U.S. Provisional Application Ser. No. 61/250,306, entitled "Phase Contrast Multi-Focal Microscope" filed Oct. 9, 2009, U.S. Provisional Application Ser. No. 61/264,432, entitled "Wavelength-Coded Multi-Focal Microscope" filed Nov. 25, 2009 and U.S. Provisional Application Ser. No. 61/381,369, entitled "System, Method and Apparatus for Contrast Enhanced Multiplexing of Images" filed Sep. 9, 2010, each application in its entirety is incorporated herein by reference. This application is related to International Application PCT/US2010/051975, entitled "System, Method and Apparatus for Phase Contrast Enhanced Multiplexing of Images" filed Oct. 8, 2010 and International Application PCT/US2010/051981, entitled "System, Method and Apparatus for Wavelength-Coded Multi-Focal Microscopy" filed Oct. 8, 2010, each application in its entirety is incorporated herein by reference.

STATEMENT OF GOVERNMENT INTEREST

The United States government has rights in this application as a result of financial support provided by governmental agencies in the development of aspects of the disclosure. Parts of this work were supported by a grant from the National Institutes of Health, Grant No.: R21CA118167 and the National Science Council Contract No.: NSC-97-2917-1-564-115.

BACKGROUND

This disclosure relates generally to imaging systems, methods and apparatus, and more particularly to volume holographic imaging systems, methods and apparatus that obtain enhanced images from multiple depths within an object.

Microscopic imaging systems are beneficial for biomedical and clinical applications. Volume holographic microscopy (VHM) has been developed as a microscopic instrument for biological samples. Volume imaging systems have many useful applications such as spectral and three spatial dimensional biological imaging (known as four-dimensional (4D) imaging), endoscope imaging systems, spectrometers, and the like.

VHM incorporates multiplexed holographic gratings within a volume hologram to visualize structures at different focal planes in an object. Each focal plane within the object is projected to a different lateral location on the camera. Thus, the entire object volume is imaged slice-wise onto the camera without the need for electrical or mechanical scanning. However, many objects of interest are composed of weak phase features with poor contrast and are barely observable with VHM.

SUMMARY

Embodiments taught herein relate generally to imaging systems, methods and apparatus, and more particularly to volume holographic imaging systems, methods and apparatus that obtain enhanced images from multiple depths within an object.

An exemplary contrast enhanced multiplexing image system taught herein obtains contrast enhanced information from multiple depths within an object without scanning. A pupil filter is introduced into the Fourier plane of a 4-f telecentric relay system to enhance weak phase information from a volume holographic imaging system. The exemplary system can be expanded to include additional multiplexed holographic gratings within a single volume hologram and, hence, simultaneously image more object slices onto non-overlapping locations on an imaging plane without scanning.

An exemplary microscope as taught herein includes focusing lenses, a holographic element, relay lenses, a pupil filter and an imaging plane. The lenses, holographic element and pupil filter together project an image onto the imaging plane. The pupil filter is advantageously located at the conjugate plane of the holographic element's pupil. The holographic element is a volume hologram with one or more multiplexed hologram gratings therein. The multiplexed holographic gratings are located at the Fourier plane of the microscope and are Bragg matched to a different focal plane within an object and simultaneously projected to a different lateral location on the imaging plane. In the exemplary embodiments, the holographic element is recorded in phenanthrenquinone doped poly methyl methacrylate.

An exemplary volume imaging system for imaging a source object as taught herein includes a holographic element, collector optics and a pupil filter. The holographic element is capable of recording one or more holograms of the source object and is configured to receive and diffract an optical field emitted or scattered from the source object onto one or more diffracted plane beams. The collector optics are configured to focus each of the one or more diffracted plane beams to a two-dimensional slice of the source object, and simultaneously project the focused two-dimensional slice along an optical path onto an imaging plane. The pupil filter is disposed along the optical path to reduce the DC component in the spatial frequency domain of the focused two-dimensional slice of the source object.

An exemplary method for imaging an object in four-dimensions and real time in which an emitted or scattered optical field of an object is received by a holographic element which diffracts the received optical field into one or more diffracted plane beams. The diffracted plane beams are focused into a two-dimensional slice of the object and filtered. The filtered two-dimensional slice is projected onto an imaging plane. When two or more slices of the object are projected, the slices are simultaneously projected to non-overlapping regions of the imaging plane. The filtering step is performed using a pupil filter. The diffraction is based on one or more Bragg degeneracy properties.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

DESCRIPTION OF EXEMPLARY EMBODIMENTS

In accordance with various embodiments taught herein are volume holographic imaging systems that employ a pupil filter to obtain contrast enhanced images from multiple depths within an object. An exemplary volume holographic imaging system can obtain contrast enhanced information from multiple depths within biological samples without scanning. An exemplary volume holographic imaging system enhances weak phase information of the displayed images which are from different depths within biological samples by introducing a pupil filter at the plane conjugate to the volume holographic pupil during imaging. This enhances weak phase features from multiple depths. An exemplary volume holographic imaging system images the entire object volume in real time without electrical or mechanical scanning, and provides enhanced edge and contrast information at all slices simultaneously. The volume hologram imaging system may be a microscope, spectroscope, endoscope, and the like and may be known as an enhanced volume holographic microscope (E-VHM).

A mouse colon placed in the exemplary volume holographic imaging system as taught herein results in two-depth resolved images separated by approximately 50 µm simultaneously displayed on an imaging plane. With the enhanced volume holographic method for contrast enhancement, the exemplary imaging system improves contrast of objects over the conventional VHM methods.

Figure 1:
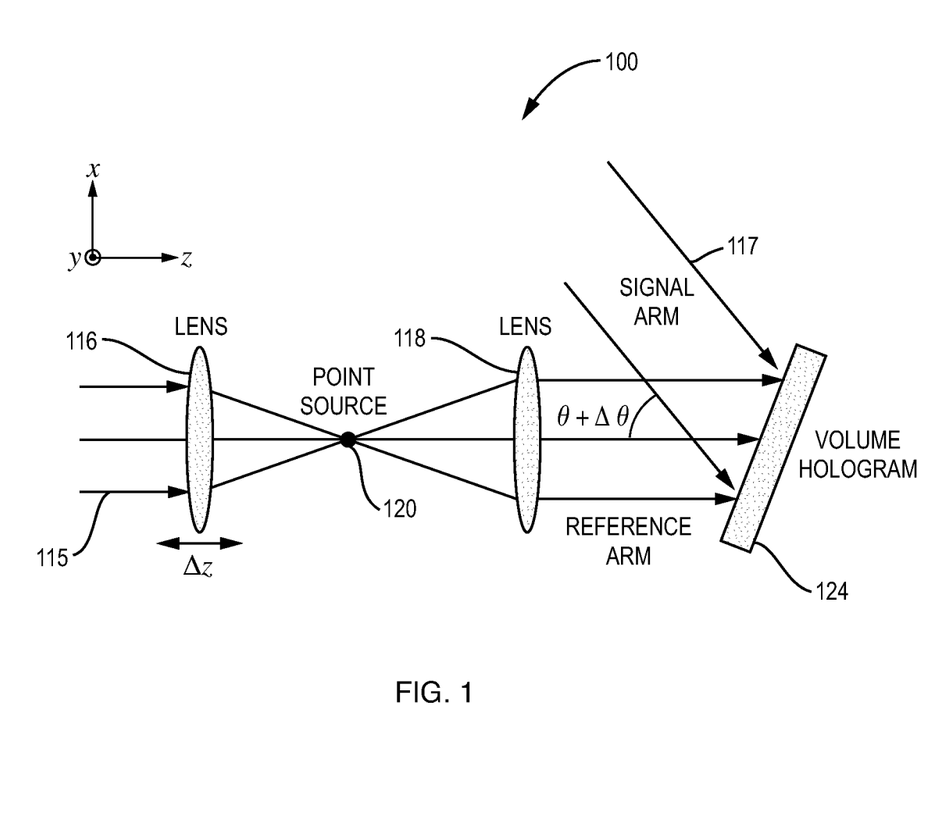
FIG. 1 depicts an illustrative diagrammatic view of a recording arrangement for multiplexing holographic gratings within a volume hologram as taught herein.

FIG. 1 illustrates an exemplary recording arrangement 100 for multiplexing holographic gratings, or recording multiple holographic gratings, within a volume hologram 124 using a source of electromagnetic radiation such as a collimated laser beam. A holographic grating may be created in a transmissive volume hologram by recording the interference pattern of two mutually coherent light beams. In an exemplary embodiment, a collimated laser beam, not shown, is split into a reference arm 115 and a signal arm 117. A point source 120 along the reference arm 115 is formed by lens 116. The point source 120 provides the source of electromagnetic radiation along the reference arm 115 which interferes with the signal arm 117 to record a grating in the multiplexed volume hologram 124. More than one grating is formed in multiplexed volume hologram 124 by varying the position of the point source 120 in the reference arm, by moving lens 116 while lens 118 stays fixed, between different exposures of electromagnetic radiation from the collimated laser beam. The nominal inter-beam angle θ is the angle between signal arm 117 and reference arm 115 at the volume hologram 124 surface and is changed by Δθ between exposures.

In some embodiments, the nominal inter-beam angle in air is 68°, Δθ is 1°, and Δz is 50 µm. In the same embodiment, the recording medium of volume hologram 124 is phenanthrenquinone doped poly methyl methacrylate (PQ-doped PMMA) and the collimated laser beam is an argon-ion (Ar$^+$) laser operating at a wavelength of approximately 488 nm.

Other materials may be used as a recording medium. By way of example, Aprilis ULSH-500, LiNbO$_3$ including Zn-doped LiNbO$_3$ and DuPont photopolymers may be used as recording material. (See Atsushi Sato et al, Applied Optics vol. 42, pp. 778-784, (2003), Yasuo Tomita et al, Optics Express vol. 14, pp. 5773-5778 (2006), and Raymond K. Kostuk et al, Applied Optics vol. 38, pp. 1357-1363 (1999)). Those skilled in the art will appreciate that each material has a range of sensitivity for recording and that another source of electromagnetic radiation with appropriate wavelength in the corresponding range of sensitivity may be used for recording. With proper fabrication, the multiplexed holographic gratings within a volume hologram can operate at wavelengths longer than the recording wavelength of signal arm 117 and reference arm 115. (See Y. Luo, P. J. Gelsinger, J. K. Barton, G. Barbastathis, and R. K. Kostuk, Opt. Lett. Vol. 33, 566-568 (2008) which is incorporated by reference herein in its entirety). In the same embodiment, the diffraction efficiencies of the two multiplexed gratings are approximately 40% and approximately 35%, the thickness of the PQ-doped PMMA recording material is approximately 1.5 mm, and the numerical apertures of lens 116 and lens 118 are 0.65 and 0.55, respectively.

Figure 2:
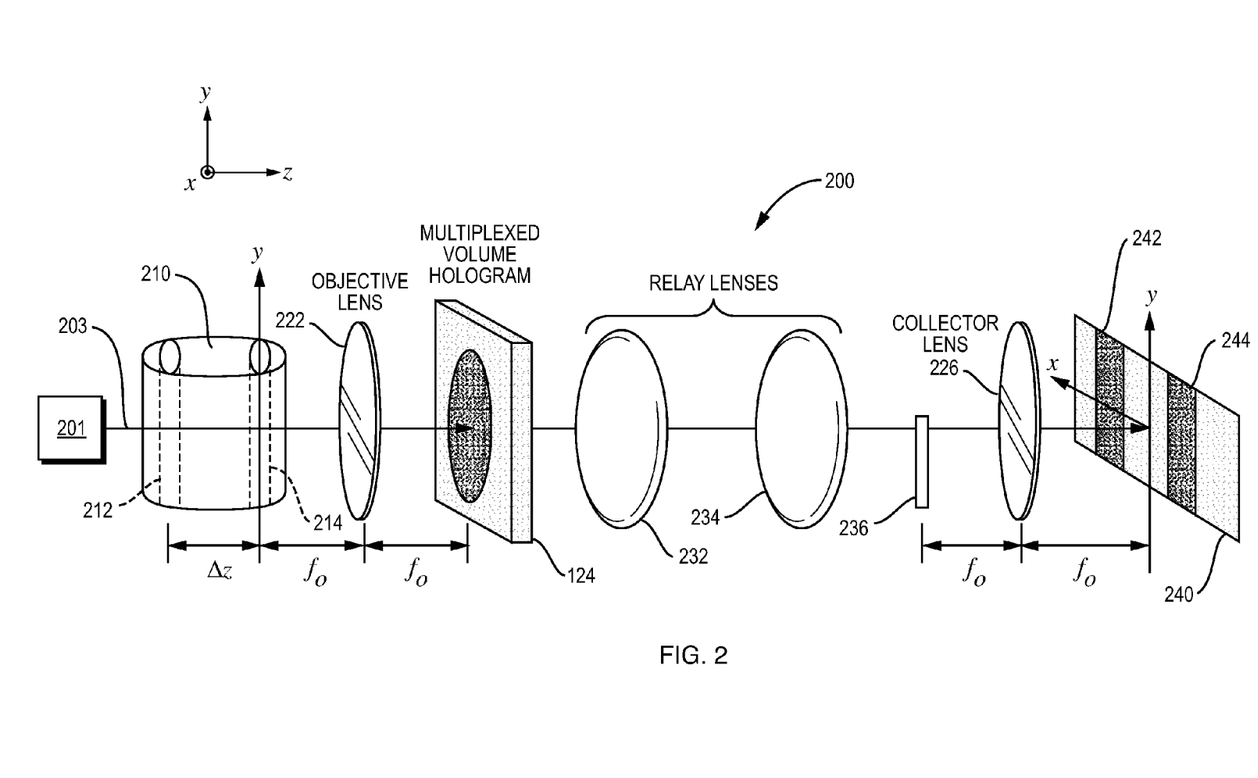
FIG. 2 depicts an illustrative diagrammatic view of an exemplary volume holographic microscope as taught herein.

FIG. 2 illustrates an exemplary imaging system 200 which may be an E-VHM system as taught herein. The system 200 includes an optional source of electromagnetic radiation 201, an objective lens 222, the multiplexed volume hologram 124, relay lenses 232 and 234, a pupil filter 236, a collector lens 226, and an imaging plane 240. Source 201 emits an electromagnetic field along signal arm 203 to object 210. An objective lens 222 acts to collimate the optical field emitted or scattered from the object 210. The collimated field passes through the multiplexed volume hologram 124 towards relay lenses 232 and 234. The emitted holographic representation from the multiplexed volume hologram 124 is relayed by lenses 232 and 234 towards the pupil filter 236. The filtered representation from the pupil filter 236 is collected by the collector lens 226 which projects images to the imaging plane 240. In an exemplary embodiment, the multiplexed volume hologram 124 has two multiplexed gratings. Each grating is Bragg matched to a different two-dimensional (2D) slices of the object 210 taken along the y-axis at first focal plane 212 and second focal plane 214. Thus, in the same embodiment, images of focal planes 212 and 214 are simultaneously projected by the system 200 to non-overlapping lateral locations, 242 and 244, respectively, on the image plane 240. The gratings are diffractive elements consisting of a periodic phase or absorption perturbation throughout the entire volume of the holographic element. When a beam of incident light satisfies the Bragg phase matching condition it is diffracted by the periodic perturbation. Those skilled in the art would appreciate that Bragg matched refers to satisfying the Bragg matching condition which occurs when the diffraction efficiency of a transmissive volume hologram is maximized.

In an exemplary embodiment, the multiplexed volume hologram 124 is located at the Fourier plane of the objective lens 222. Similarly, the imaging plane 240 is located at the Fourier plane of the collector lens 226. In the same embodiment, the distance $f_o$ is the distance between the second focal plane 214 and the objective lens 222. Those skilled in the art would appreciate that the grating within multiplexed volume hologram 124 that is Bragged matched to the second focal plane 214 is located a distance of $f_o$ from the objective lens 222. Relatively positioned between the multiplexed volume hologram 124 and the collector lens 226 is a relay system composed of relay lenses 232 and 234. Pupil filter 236 is located such that it images the pupil of the multiplexed volume hologram onto the front focal plane of the collector lens 226. The distance $f_c$ is the distance between the pupil filter 236 and the collector lens 226, which is the same distance between the collector lens 226 and the imaging plane 240.

In exemplary embodiments, the source of electromagnetic radiation may be a plurality of coherent light sources, a broadband light source such as a dispersed white-light source with chromatic foci, a plurality of light emitting diodes or the like. The imaging plane 240 may be part of a charge couple device or camera which may be connected to or part of a computer, projector, or other such device. In some embodiments, the pupil filter may be any amplitude filter resulting in enhanced contrast information such as an opaque mask, gray scale mask, or the like. In some embodiments, the use of an opaque mask may result in a significant loss in intensity of the resulting image but this may be corrected by using a cooled charge-coupled device with high dynamic range as part of the imaging plane 240.

Figure 3:
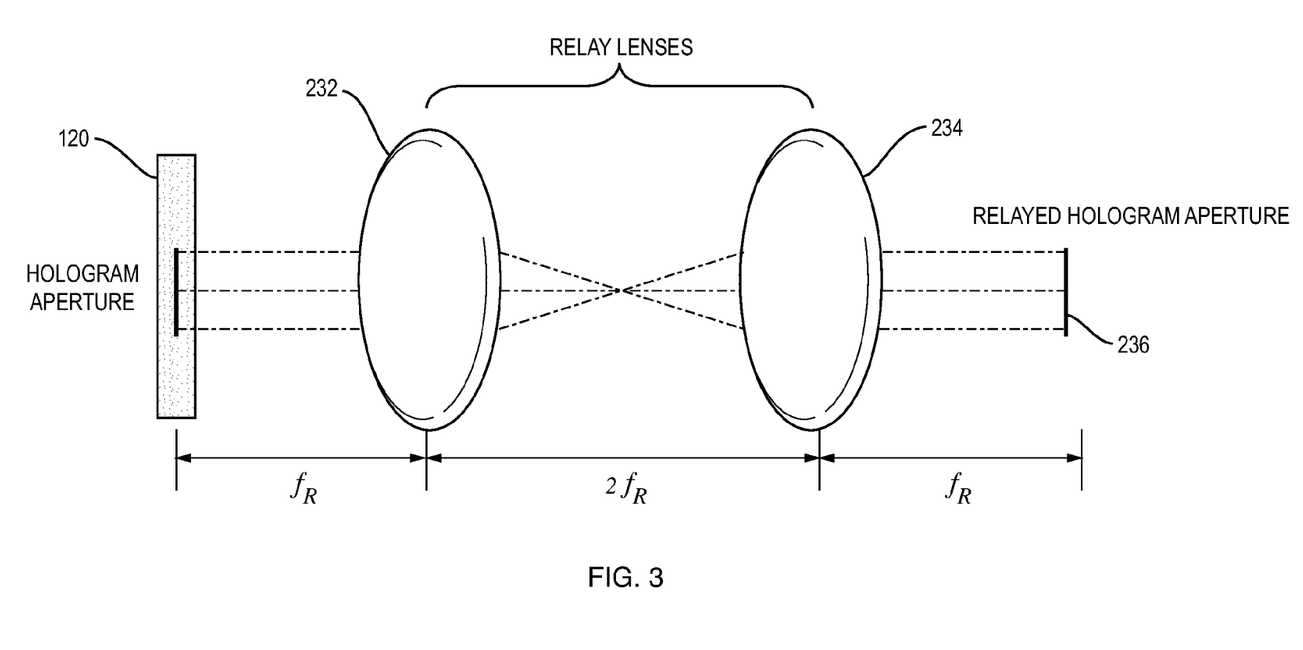
FIG. 3 depicts an illustrative diagrammatic view of the 4-f telecentric relay system of the volume holographic microscope of FIG. 2.

FIG. 3 depicts an exemplary placement relationship of the relay system located between lenses 232 and 234 of the imaging system of FIG. 2. The relay system located between lenses 232 and 234 is a 4-f telecentric system. The distance $f_R$ is the distance between the multiplexed volume hologram 124 and the relay lens 232. The distance between the relay lenses 132 and 134 is two times the length of distance $f_R$. The distance $f_R$ is also the distance between the relay lens 234 and the pupil filter 236. Pupil filter 236 is therefore located on the conjugate plane of the multiplexed volume hologram 124 relayed through the 4-f telecentric relay system, i.e. on the 4-f telecentric relay system's Fourier plane. The pupil filter 236 eliminates the DC component in the spatial frequency domain to achieve the enhanced volume holographic method, as taught herein. This enhancement is observed in parallel at all the multiplexed focal planes (slice-wise images from multiple depths within object 210) of the exemplary imaging system 200.

Figure 4:
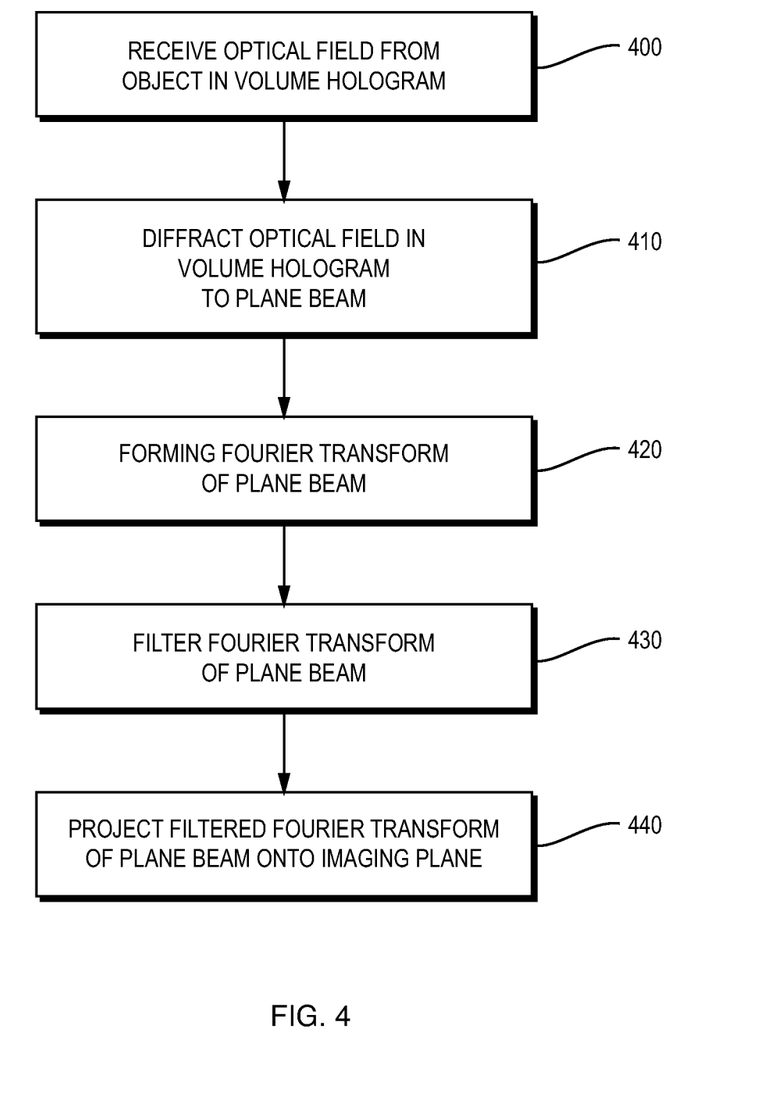
FIG. 4 is a flow diagram depicting an illustrative method for practicing an embodiment of an exemplary volume holographic imaging system as taught herein.

FIG. 4 depicts an exemplary method of imaging an object defined in four-dimensional space and real time using an exemplary volume holographic imaging system as taught herein. In step 400, multiplexed volume hologram 124 receives an optical field that has been scattered or emitted from the object 210 of interest. In some embodiments, the scattered or emitted optical field may be processed by one or more optical elements, such as the objective lens 222, to focus the received optical field onto the volume hologram 124. In step 410, a grating within the multiplexed volume hologram 124 diffracts the received optical field into one or more plane beams. The plane beam is a holographic representation of a 2-D slice of the object 210 taken at a plane within the object 210 that is Bragg matched to the grating in the volume hologram 124. In step 420, the Fourier transform of the plane beam is formed by the relay lenses 232 and 234 at an intermediate plane located at the pupil filter 236. In step 430, the Fourier transform of the plane beam is filtered by the pupil filter 236 to a filtered Fourier transform of the plane beam. In step 440, the Fourier transform of the plane beam diffracted from the pupil filter 236 is projected onto an imaging plane 240. In some embodiments, the volume hologram 124 has two or more gratings recorded therein. In the same embodiment, the number of 2-D images that are simultaneously projected onto the imaging plane 240 in a non-overlapping manner correspond to the number of gratings. Advantageously, the multiple images are simultaneously projected to non-overlapping portions of the imaging plane.

Figure 5:
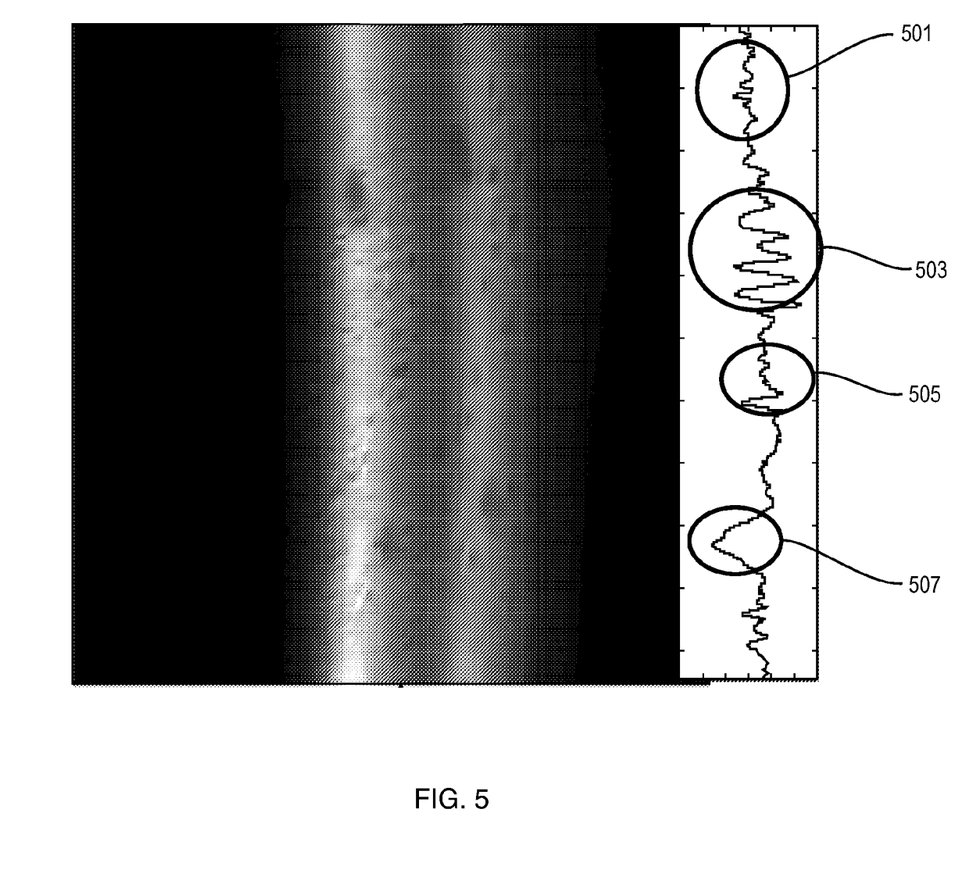
FIG. 5 illustrates an image of a mouse colon sample obtained by a conventional volume holographic microscope.
Figure 6:
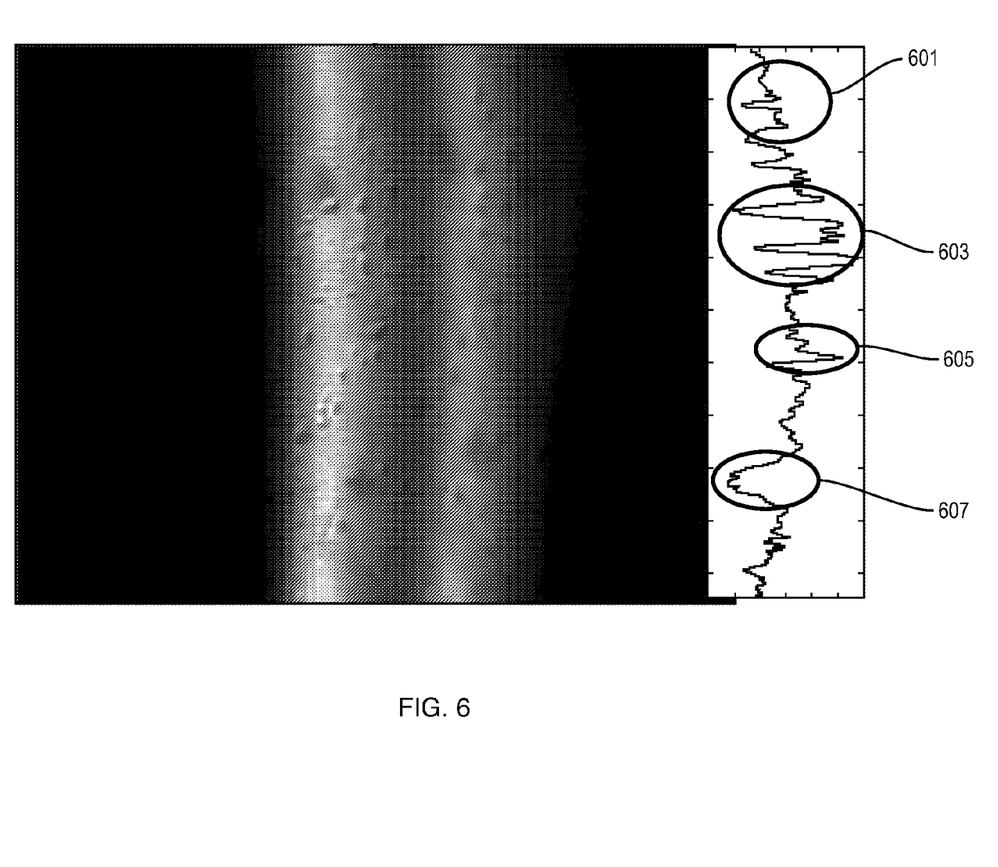
FIG. 6 illustrates an image of the mouse colon sample used in FIG. 5 obtained by an exemplary volume holographic microscope as taught herein.

FIG. 5 depicts two depth resolved images of a mouse colon obtained using a conventional VHM. FIG. 6 depicts two depth resolved images of the mouse colon of FIG. 5 obtained using the exemplary imaging system 200 using an opaque mask as the filter 236. The images in FIGS. 5 and 6, were obtained by the PQ-doped PMMA volume hologram 124 with two multiplexed gratings each grating imaging in parallel a different slice through the object: one slice just below the tissue surface and one approximately 75 μm in to the tissue. The mouse colon was illuminated using a red LED with central wavelength of approximately 630 nm and spectral bandwidth of approximately 25 nm using the exemplary imaging system 200 of FIG. 2. An Olympus objective lens (ULWDMSPlan 50X), a Mitutuyo collector lens (MPlanAPO20X), and an Andor iXon CCD array (Andor X-2647) were used to produce the images of FIGS. 5-6. The field of view of this embodiment was approximately 1 mm by 0.8 mm.

FIGS. 5 and 6 further include the contrast ratio of four arbitrarily selected regions along an arbitrarily selected vertical line on each image (right-hand side inset of FIG. 5 and FIG. 6). Regions 501, 503, 505 and 507 in FIG. 5 correspond to regions 601, 603, 605, and 607, respectively, in FIG. 6. Each region 601, 603, 605, and 607 has a higher contrast ratio than the corresponding region 501, 503, 505 and 507. In particular, each region, 601, 603, 605, and 607, has a higher amplitude than its corresponding region, 501, 503, 505 and 507, resulting in a higher sustained peak contrast ratio value for each region 601, 603, 605, and 607. Thus at the four arbitrarily selected regions, in the two images, the contrast ratio in FIG. 5 using the conventional VHM system was lower than at the same location in FIG. 6 using the exemplary imaging system 200 as taught herein.

Advantageously the exemplary imaging systems taught herein increase the identification of structures, such as the turbid media depicted in FIGS. 5 and 6. The resulting images are contrast-enhanced, two-dimensional and observable in real time. Furthermore, exemplary imaging systems as taught herein can be applied to both fluorescence and non-fluorescence imaging and collects both spectral and spatial information of an object without mechanically scanning in the X-Y-Z direction for a given field of view.

Although the teachings herein have been described with reference to exemplary embodiments and implementations thereof, the disclosed methods, systems and apparatus are not limited to such exemplary embodiments/implementations. Rather, as will be readily apparent to persons skilled in the art from the description taught herein, the disclosed methods, systems and apparatus are susceptible to modifications, alterations and enhancements without departing from the spirit or scope hereof. Accordingly, all such modifications, alterations and enhancements within the scope hereof are encompassed herein.

What is claimed:
1. A microscope comprising:
an objective lens for receiving and collimating electromagnetic radiation emitted or scattered from an object of interest;
a volume hologram with one or more multiplexed holographic gratings to receive and diffract the collimated electromagnetic radiation;
a relay system to receive and relay the diffracted collimated electromagnetic radiation from the volume hologram to a relayed conjugate plane of the volume hologram's pupil;
a pupil filter located at the relayed conjugate plane of the volume hologram's pupil to receive and filter the relayed collimated electromagnetic radiation from the relay system; and
a focusing lens to focus onto an imaging plane the collimated electromagnetic radiation that passes through the pupil filter, and
wherein the pupil filter is disposed along the optical path between the relay system and the focusing lens.

2. The microscope of claim 1, wherein the pupil filter is an opaque mask.

3. The microscope of claim 1, wherein the pupil filter is a gray scale mask.

4. The microscope of claim 1, wherein the volume hologram is recorded in phenanthrenquinone doped poly methyl methacrylate.

5. The microscope of claim 1, wherein the volume hologram has two or more multiplexed holographic gratings.

6. The microscope of claim 1, wherein the microscope simultaneously projects an image associated with each holographic grating onto the imaging plane.

7. The microscope of claim 1, wherein the volume hologram diffraction of the received collimated electromagnetic radiation is based on one or more Bragg properties.

8. The microscope of claim 1, wherein the relay system is a 4-f telecentric relay system.

9. The microscope of claim 1, further comprising a source of electromagnetic radiation.

10. A volume imaging system for imaging a source object comprising:
  a transmissive holographic element having multiplexed holographic gratings recorded therein, the hologram element configured to receive and diffract an optical field emitted or scattered from the source object into one or more diffracted plane beams;
  collector optics configured to:
    focus each of the one or more diffracted plane beams to a two-dimensional slice of the source object; and
    project the focused two-dimensional slice along an optical path onto an imaging plane; and
  a pupil filter disposed along the optical path at a conjugate plane of the transmissive holographic element's pupil to eliminate the DC component in the spatial frequency domain of the focused two-dimensional slice of the source object, the pupil filter being an opaque mask or a gray scale mask.

11. The volume imaging system of claim 10, wherein the holographic element diffracts the optical field emitted or scattered from the source object based on one or more Bragg properties.

12. The volume imaging system of claim 10, wherein the collector optics includes an imaging lens.

13. The volume imaging system of claim 12, wherein the collector optics includes a 4-f telecentric relay system.

14. The volume imaging system of claim 13, further comprising, a source of electromagnetic radiation.

15. The volume imaging system of claim 14, wherein the volume imaging system is configured to simultaneously diffract an optical field from each slice of the source object to a non-overlapping region of the imaging plane.

16. The volume imaging system of claim 15, wherein the source object is defined in four-dimensional space and real time.

17. A method for imaging an object in four-dimensions and real time comprising:
  receiving an emitted or scattered optical field of an object in a transmissive holographic element;
  diffracting the received optical field in the holographic element to one or more diffracted plane beams;
  forming the Fourier transform of the one or more diffracted plane beams at an intermediate plane;
  filtering the Fourier transform of the one or more diffracted plane beams of the object using a pupil filter located at a conjugate plane of the transmissive holographic element, the pupil filter being an opaque mask or a gray scale mask; and
  projecting the filtered Fourier transform of the one or more diffracted plane beams onto an imaging plane.

18. The method of claim 17, wherein the pupil filter eliminates the DC component in the spatial frequency domain of the Fourier transform of the one or more diffracted plane beams of the object.

19. The method of claim 17, wherein the forming step is performed using relay lenses.

20. The method of claim 17, further comprising the step of processing the emitted or scattered optical field through objective optics.

21. The method of claim 20, wherein the objective optics comprises a collimating lens configured to collimate the emitted or scattered optical field.

22. The method of claim 21, wherein the objective optics is part of the holographic element.

23. The method of claim 17 wherein the diffraction by the holographic element is based on one or more Bragg properties.

* * * * *